(12) United States Patent
Dahlquist

(10) Patent No.: US 10,960,480 B2
(45) Date of Patent: Mar. 30, 2021

(54) SOLID PALLET FOR CLAMPING CHUCKS

(71) Applicant: System 3R International AB, Vällingby (SE)

(72) Inventor: Håkan Dahlquist, Hässelby (SE)

(73) Assignee: System 3R International AB, Vällingby (SE)

( * ) Notice: Subject to any disclaimer, the term of this patent is extended or adjusted under 35 U.S.C. 154(b) by 168 days.

(21) Appl. No.: 15/317,680

(22) PCT Filed: Jun. 2, 2015

(86) PCT No.: PCT/EP2015/062230
§ 371 (c)(1),
(2) Date: Dec. 9, 2016

(87) PCT Pub. No.: WO2015/193103
PCT Pub. Date: Dec. 23, 2015

(65) Prior Publication Data
US 2017/0120360 A1    May 4, 2017

(30) Foreign Application Priority Data

Jun. 19, 2014  (EP) ..................... 14173087

(51) Int. Cl.
*B23H 11/00*   (2006.01)
*B23Q 1/00*    (2006.01)
*B23Q 3/10*    (2006.01)

(52) U.S. Cl.
CPC ......... *B23H 11/003* (2013.01); *B23Q 1/0063* (2013.01); *B23Q 1/0072* (2013.01); *B23Q 3/103* (2013.01)

(58) Field of Classification Search
CPC ........ B23H 11/003; B23H 7/26; B23Q 3/103; B23Q 3/18; B23Q 1/0072; B23B 31/103;
(Continued)

(56) References Cited

U.S. PATENT DOCUMENTS 3,740,800 A * 6/1973 Meyer ...................... B60J 10/70
24/295
3,741,573 A   6/1973 Treer
(Continued)

FOREIGN PATENT DOCUMENTS

DE    3729601 C1   10/1988
DE    4428310 A1   2/1996
(Continued)

OTHER PUBLICATIONS

International Search Report and Written Opinion for PCT/EP2015/062230, dated Jul. 29, 2015.
(Continued)

*Primary Examiner* — Orlando E Aviles
*Assistant Examiner* — Seahee Hong
(74) *Attorney, Agent, or Firm* — Bachman & LaPointe, P.C.

(57) ABSTRACT

The invention refers to a chuck pallet (1.3) with solid groove-sidewalls (2.3) for clamping chucks (1.1), whereby the x-y-references (2.5) of the chuck pallet (1.3) are allocated in the same plane (2.1) as the z-references (2.1) and the x-y-references (2.5) are also allocated at the solid groove-sidewalls (2.3). The solid groove-sidewalls (2.3) have thereby a tapered profile.

20 Claims, 6 Drawing Sheets

(58) Field of Classification Search
CPC ..... B23B 31/12; B23B 31/1078; B23B 31/24; B23B 31/1071
USPC ......... 269/309, 20, 310; 279/133; 219/69.15
See application file for complete search history.

(56) References Cited

U.S. PATENT DOCUMENTS

| | | | | |
|---|---|---|---|---|
| 3,787,125 | A * | 1/1974 | Traut | F04C 2/44 |
| | | | | 279/133 |
| 3,880,267 | A | 4/1975 | Auble et al. | |
| 4,621,960 | A * | 11/1986 | Tollner | B23B 31/00 |
| | | | | 279/102 |
| 4,855,558 | A | 8/1989 | Ramsbro | |
| 4,876,429 | A * | 10/1989 | Buchler | B23H 7/26 |
| | | | | 219/69.15 |
| 4,934,680 | A | 6/1990 | Schneider | |
| 5,634,757 | A | 6/1997 | Schanz | |
| 6,367,814 | B1 | 4/2002 | Lüscher et al. | |
| 6,378,877 | B1 | 4/2002 | Lüscher et al. | |
| 6,609,851 | B2 * | 8/2003 | Nordquist | B23H 7/26 |
| | | | | 269/309 |
| 6,674,041 | B2 * | 1/2004 | Nordquist | B23H 7/26 |
| | | | | 219/69.15 |
| 7,303,195 | B2 * | 12/2007 | Nie | B23B 31/103 |
| | | | | 269/309 |
| 7,367,552 | B2 | 5/2008 | Greber | |
| 8,047,520 | B2 * | 11/2011 | Kuroda | B23Q 1/0081 |
| | | | | 269/309 |
| 8,152,151 | B2 * | 4/2012 | Sandmeier | B23B 31/1078 |
| | | | | 269/20 |
| 9,592,579 | B2 * | 3/2017 | Hediger | B23B 31/001 |
| 2003/0168795 | A1 * | 9/2003 | Fries | B23Q 1/0072 |
| | | | | 269/309 |
| 2005/0098407 | A1 * | 5/2005 | Greber | B23Q 1/0072 |
| | | | | 192/55.2 |
| 2006/0239326 | A1 * | 10/2006 | Lin | B23H 7/26 |
| | | | | 373/88 |
| 2007/0065678 | A1 * | 3/2007 | Ko | C23C 16/4586 |
| | | | | 428/698 |

FOREIGN PATENT DOCUMENTS

| | | |
|---|---|---|
| EP | 0255042 A1 | 2/1988 |
| EP | 0997220 A2 | 5/2000 |
| EP | 1068919 A1 | 1/2001 |
| EP | 1266713 A2 | 12/2002 |
| EP | 1529594 A1 | 5/2005 |

OTHER PUBLICATIONS

Theodore J. Krenzer, M.S., and Robert G. Hotchkiss, B.S., "Bevel and Hypoid Gears", Standard Handbook of Machine Design, Chapter 11, Downloaded from Digital Engineering Library @ McGraw-Hill (www.digitalengineeringlibrary.com), Dec. 7, 2016,the McGraw-Hill Companies, New York, New York.

* cited by examiner

SOLID PALLET FOR CLAMPING CHUCKS

BACKGROUND

The present invention relates to a chuck pallet and a clamping system with such a chuck pallet.

Clamping systems with chuck pallets are commonly known in the field of workpiece machining with machine tools like milling, turning or electrical discharge machining (EDM). The clamping systems are used to hold the workpiece to be machined or the machining tools (particularly in the EDM applications). High cutting forces are sometimes exerted on the workpiece during its machining. These high forces are consequently also transmitted to the chuck systems holding the workpiece on the machining table. Clamping systems need therefore to be rigidly designed and constructed to withstand the applied forces and particularly to exactly maintain the positioning of the workpiece, avoiding therewith inaccurate machining of the workpiece.

Rigid versions of clamping systems are known. Such systems can for instance be designed to have six or more contact points between pallet and chuck, offering therewith a rigid clamping. Such known systems have on the other hand also some disadvantages. Clamping couplings with more than six contact points are overdetermined. Overdetermined couplings are favorable regarding the combination of high rigidity, high load capacity and accuracy. The problem is to design and manufacture them in a way that leads to contact with all the reference surfaces without any jam or play. This could be done with high manufacturing tolerances. However, this has until now not been sufficient for reaching the required position accuracy of the reference surfaces. The reason is that the designs have included tolerance chains leading to micro displacements of the reference surfaces. Such displacements affect both jam and micro play in high precision couplings.

The patent publication U.S. Pat. No. 3,741,573A describes an early EDM clamping coupling where the overdetermined principle was applied. However, in order to avoid jam a "close fitting" (see U.S. Pat. No. 3,741,573A col. 5, line 63) was used. This means there was a small play in the xy connection and such play is not accepted today or in applications for which the new invention here in matter is intended for.

The document EP 0 255 042 B1 discloses a clamping system known on the market as the "3R Macro system". This system uses elastic tongues. The principle with minimizing the tolerance chain was applied by having the xy contact edge where the z-plane meets the upper edge of the end surfaces of the tongues. The elastic tongues are very favorable regarding accuracy but give a lower load limit and rigidity compared to a solid coupling according to the new invention EP1068919 B1 describes a clamping coupling where solid references are used. The xy contacts of the pallet are in a recessed position by a two-step design of the groove (see FIG. 3). This means that the tolerance of the height of these steps affect the contact edge position accuracy. This tolerance chain adds position error leading to a difficult and costly manufacturing or to a coupling with jam or play (this disadvantage is further discussed further down in relation to the document EP01529594 B1). The purpose with the two-step groove is to protect the contact edge when the pallet is placed on a table or in a magazine. However, in real use the pallet is often not carefully placed on the chuck but roughly. This is particularly the case at automatic loadings. The contact edges are then hitting the chuck lug references and could be damaged. This problem is not solved in EP1068919 B1 but will be by a preferred embodiment of the new invention.

The publication "Handbook of machine design" (see chapter 11 Bevel and Hypoid gears Krenzer, Hotchkiss, sec. 11.7.7) describes the basic rule of a bevel gear design. The contact pattern is expanding with the load but must never reach the boundaries of the tooth surface, i.e. never come across the edges of the tooth surface. This is emphasized in section 11.7.7 of the publication.

U.S. Pat. No. 3,880,267A describes an overdetermined coupling, where the basic rule of bevel gear design (see foregoing paragraph) is applied. In FIGS. 4 and 10 it is illustrated that the lug element 28 is curved in order to avoid edge contact on the lug element 26. FIG. 10 shows this in combination with having a z-surface contact against the top of lug 28. The combination with a curved against a straight surface leads to an expanded contact with increasing load and unfavorable tolerance displacements of the surfaces.

EP01529594 B1 describes an overdetermined coupling with surface expanding function in accordance to the already cited documents U.S. Pat. No. 3,880,267A and the publication "Handbook of machine design". In this patent document the length of the elastic steel material has been increased by having contact on only one side of the lugs and grooves. The disadvantages are that the one-side-contact reduces the translational rigidity in the xy-plane as well as the torsional rigidity. This is due to fewer available xy contacts. A further important disadvantage is that the axial distance between the z-plane and the xy contacts spots leads to an inaccuracy in spot location due to the tolerance chain created. This tolerance chain would have led to a jam or play in case of providing contacts at both sides in the grooves.

The document EP1266713 A2 describes an overdetermined clamping system, known on the market under the product name "Macro" from the company System 3R. The holder is made of sintered material. It utilizes the lower stiffness of sintered materials to allow an elastic deformation of the contact edges. That product was just manufactured during a short period, since it led to jam after a while. The friction became too high in repeated EDM usage.

SUMMARY

It is the object of this invention to eliminate the disadvantages of known chuck pallets or clamping systems, particularly to avoid tolerance chains and thereby micro displacements of the reference surfaces.

The object of this invention is achieved by a chuck pallet designed in accordance with the features of claim 1.

Thanks to the inventive chuck pallet, it is possible to reach micron repeatability respectively accuracy together with a very high coupling rigidity and load capacity. By that, both very hard and fine machining as well as grinding is possible. The workpiece is mounted on the very same pallet during all these operations in consecutive machines, increasing therewith the production efficiency.

In addition the pallet has small x-y-references—e.g. two short xy reference edges, in a preferred embodiment also with thin standing xy reference surfaces following below. This is also favorable for minimizing the contact edges respectively contact areas and thereby increasing the insensibility of the chuck pallet against dirt and particles during clamping.

The tolerance chain is eliminated with this invention by having the xy reference contacts on the edges where the z-plane is meeting/intersecting the tapered and solid groove-sidewalls.

A further advantage of the inventive chuck pallet is to have the solid groove-sidewalls respectively the x-y-reference surfaces, which can expand their contact to the chuck lugs from a well-defined edge contact downwards at clamping to a surface contact for absorbing the manufacturing tolerances. That expansion to a surface contact can also take place as result of external loading at pallet usage in machining. The magnitude of the expansion to a surface contact is also depending on the actual tolerances from the manufacturing of the chuck pallet, i.e. last grinding process in pallet production. By that, the expansion gives the necessary resilience to absorb the manufacturing tolerances. The expansion to a surface contact is realized by a small difference in the taper angle. This feature allows the manufacturing of a solid coupling. In a preferred embodiment of the invention, is can be foreseen to provide a protection of the reference surfaces and reference edges by an elastic, rubberlike elements protruding towards the corresponding lug surface of the chuck. In a specific version of that embodiment, the rubber elements are also protruding above the z-plane resp. z-reference. By that, the z-plane and the x-y-reference surfaces or x-y-reference edges are protected when pallets are placed on a table or in a magazine.

None of the cited prior art combines these elements, neither alone nor in combination. Particularly, none discloses a solid overdetermined coupling with xyz references in the same plane, minimizing the tolerance chain, allowing the so called CMM measuring (Coordinate Machine Measuring) and master chuck control as well as having xy contacts that expand from the z-plane edge.

BRIEF DESCRIPTION OF THE DRAWINGS

The invention, preferred embodiments, as advantages and technical effects of the inventive chuck pallet will now be explained with reference to schematic figures.

DETAILED DESCRIPTION

Figure 1:
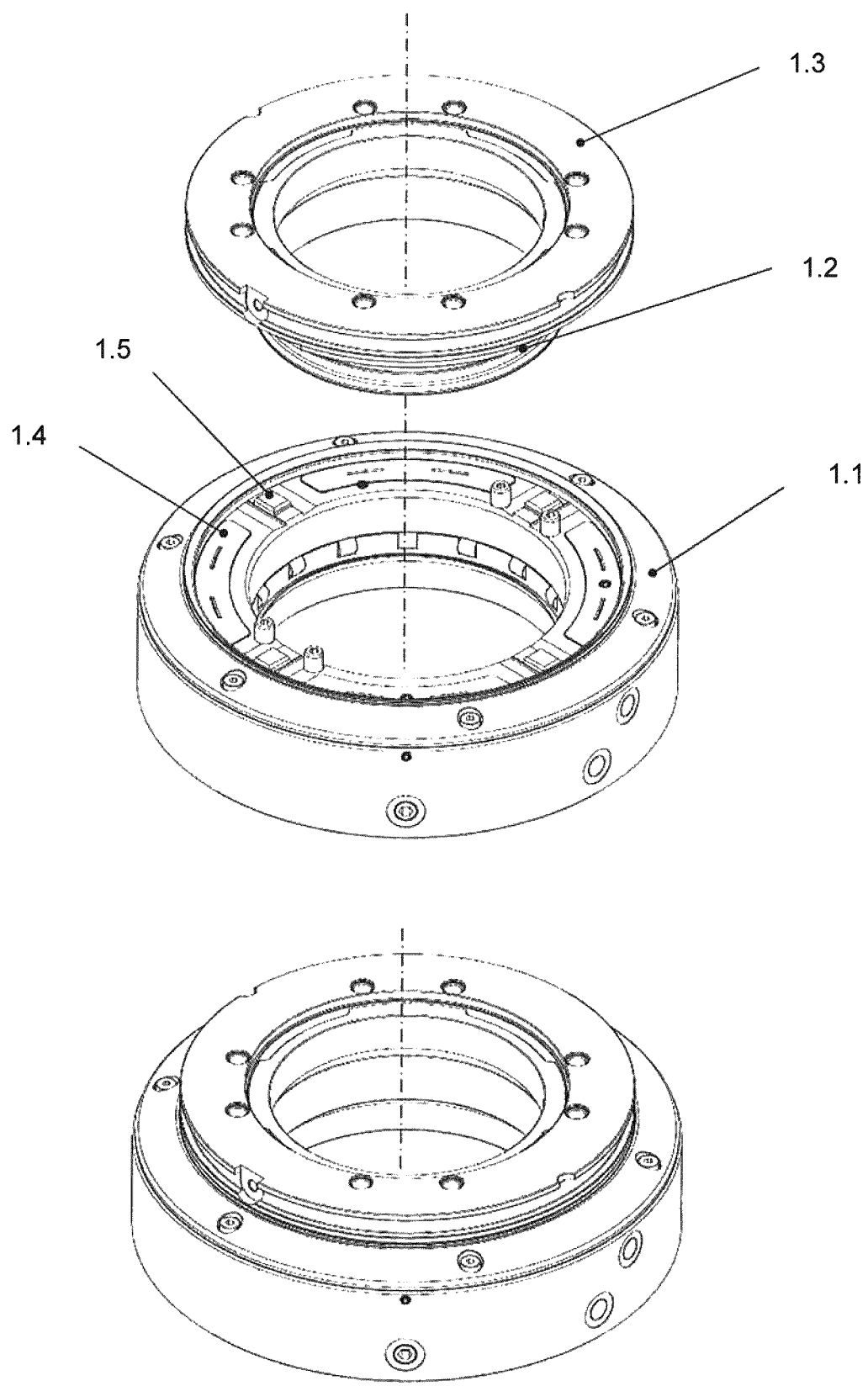
FIG. 1 is an exploded view of a clamping chuck a detachable connected draw sleeve and a known pallet.

The FIG. 1 shows a 3D-view of the clamping chuck 1.1 with a detachable connected draw sleeve 1.2 and a known pallet 1.3 for mounting of a workpiece or tool as disclosed in the cited document EP1741511 B1. The chuck 1.1 has a number of z-surface protrusions 1.4 forming the z-reference plane. The chuck has further four xy-lugs 1.5 in a cross. These lugs have tapered x-y-reference surfaces on both sides. The position of the pallet is determined in all (meaning xyz) directions in clamped position and without any play. The z-planes of the chuck and pallet are then in contact and the x-y-lugs 1.5 of the chuck are slightly pressed into the grooves of the pallet (not visible) leading to a contact as described further above.

Figure 2A:
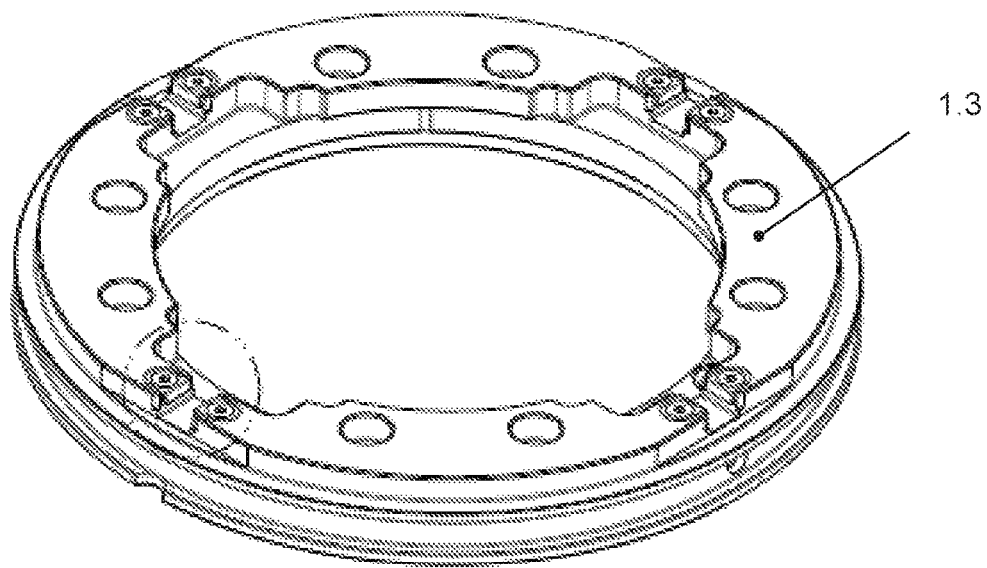
FIG. 2a is a view of the lower side of the inventive chuck pallet with an enlarged detail view of a portion of the chuck pallet.
Figure 2A:
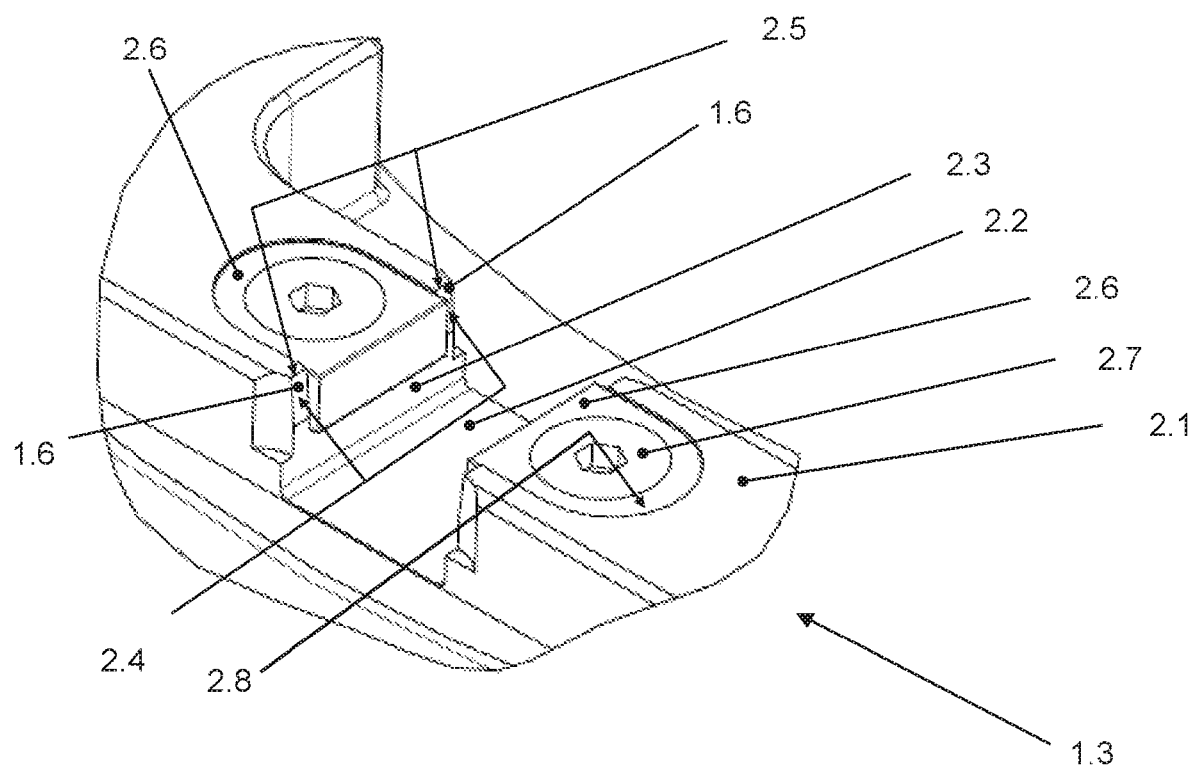

The FIG. 2a shows a view of the lower side of the inventive chuck pallet 1.3. The lower side has a flat ground surface defining the z-plane respectively the z-reference 2.1. The z-plane 2.1 has grooves 2.2 with solid groove-sidewalls 2.3 on both sides which are preferably made of non-sintered material. Being solid, the groove-sidewalls 2.3 contain no slot behind the x-y-reference surfaces 2.4 respectively any slot extending parallel and behind the x-y-reference surface 2.4, as represented for instance by the elastic tongues disclosed for instance in the EP 255042B1. The x-y-reference surfaces 2.4 are allocated at the upper portion of the solid groove-sidewalls 2.3. The x-y-reference surfaces 2.4 cut through i.e. intersect the z-plane 2.1 and define the exact location of the x-y-reference edges 2.5.

In a preferred embodiment of the invention also illustrated in the FIG. 2a, the x-y-reference edges 2.5 can be protected from damages caused by rough positioning at clamping and other impacts or hits by an elastic protector 2.6 (e.g. made of rubber) in a slot 2.8. That protector can be preferably placed in the middle of the groove 2.2 or at one side of the groove (FIG. 2a shows a slot and a protector on both sides of each groove). In the first case the rubber protector divides the x-y-reference surface into two portions, forming therewith the solid standing bars 1.6 with their respective x-y-reference surface 2.4. By that, the width of each x-y-reference surface portion 2.4 is small leading to short x-y-reference edges 2.5. In clamped configuration, the short edge contact of the x-y-reference edges 2.5 can expand to small surface contact 4.2 of the x-y-reference surface 2.4. These short edge or small surface contact is advantageously, since it makes the chuck pallet less sensitive to dirt and particles, which affect known clamping system. As an effect of the present invention, the elastic surface expansion takes also place to absorb the manufacturing tolerances of the produced x-y-reference surfaces during the manufacturing of the inventive chuck pallet. Further advantageously, the elastic surface expansion absorbs also surface pressure at higher loads of the pallet, avoiding therewith to exceed the maximum allowed surface pressure.

Figure 2B:
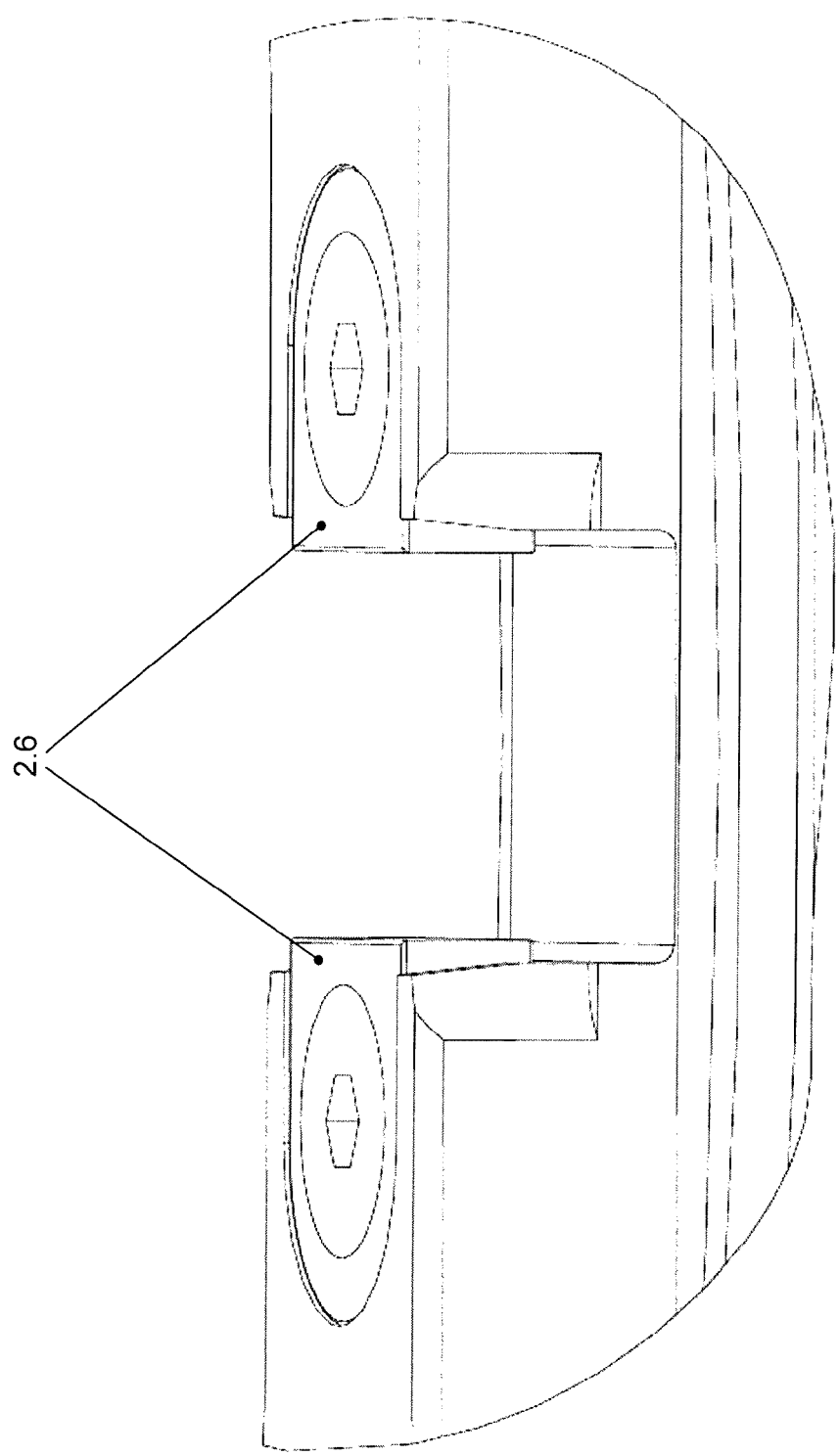
FIG. 2b is a second detail view of the portion of the inventive chuck pallet.

The FIG. 2b illustrates the inventive chuck pallet 1.3 showed in FIG. 2a from another angle.

Figure 2C:
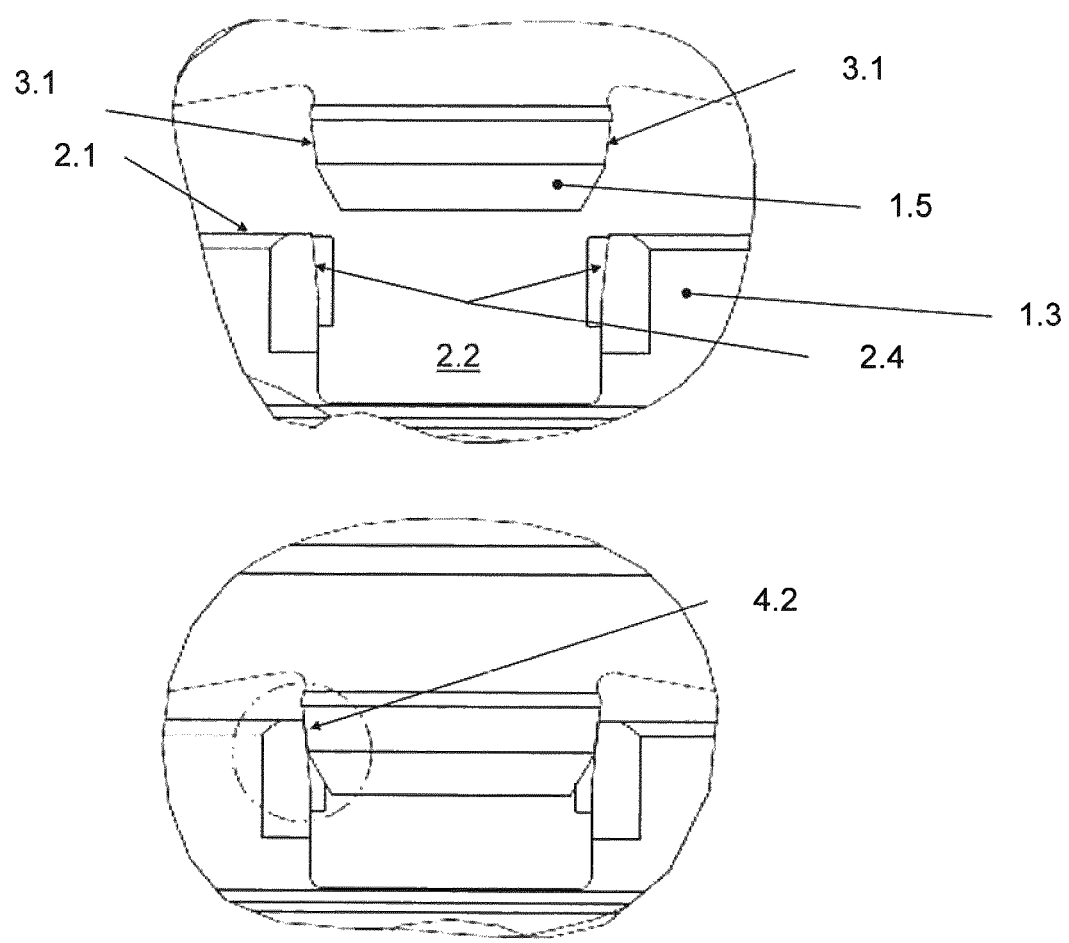
FIG. 2c shows a chuck lug in respective unclamped and clamped positions.

The FIG. 2c shows the invention with a chuck lug 1.5 in unclamped respectively clamped position. The tapered x-y-reference surfaces 3.1 of the chuck lugs 1.5 have a slightly larger tapered angle than the corresponding x-y-reference surfaces 2.4 of the groove 2.2 of the inventive chuck pallet 1.3. This leads to an edge contact in level of the z-plane 2.1. By that, the exact location of the edge is determined allowing manufacturing with the required very high accuracy. The edge respectively line contact can expand to a surface contact 4.2 (see lower illustration of FIG. 2c) according to the explanations given above.

Figure 3:
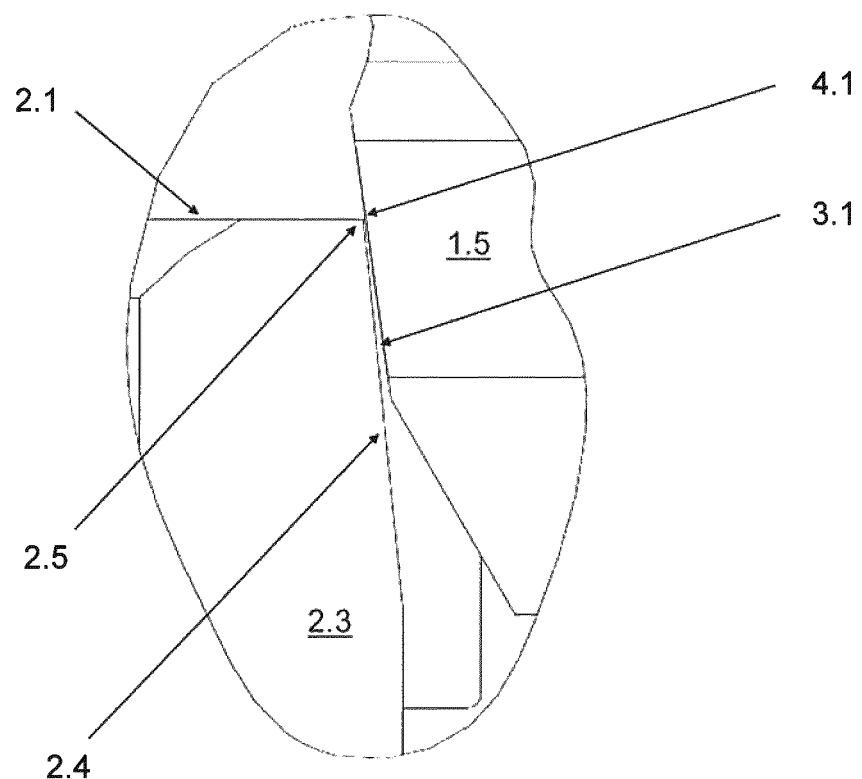
FIGS. 3 and 4 are enlarged views of the chuck lug in the clamped position.
Figure 4:
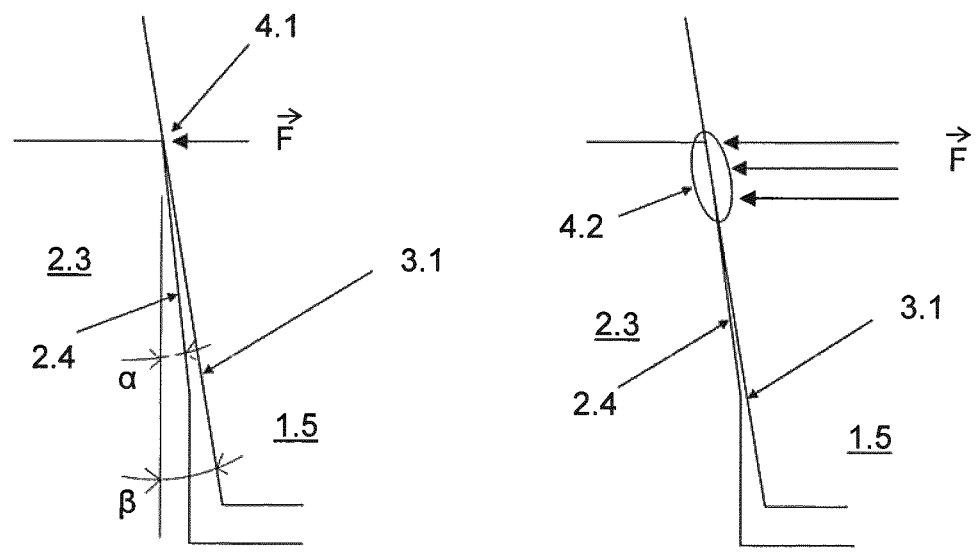

The FIGS. 3 and 4 are enlarged views of the chuck lug 1.5 in clamped position. They show the difference in taper angles of the x-y-reference surfaces 3.1 of the chuck lug 1.5—with the inclination angle β—and the x-y-reference surfaces 2.4 of the chuck pallet 1.3—with the inclination angle α—in an exaggerated way to show the edge contact 4.1 in level with the z-plane.

The FIG. 4 shows to the left the edge respectively line contact 4.1—occurring at lower press respectively at lower loads F—of the x-y-reference surfaces 2.4 of the solid groove sidewall 2.3 of the chuck pallet 1.3 with the corresponding x-y-reference surfaces 3.1 of the chuck lug 1.5.

The sketch to the right shows on the other hand the situation where the edge contact 4.1 expanded to a surface contact 4.2 once higher press respectively at higher exerted loads F on the chuck system. The improvement of the invention compared to the state of the art is that the first contact or contact area always starts from the z-plane 2.1 as a line contact 4.1. By this, there is no tolerance chain away from the z-plane. This is a prerequisite for the ability to manufacture and measure an overdetermined coupling with such accurate tolerances that no jam or play appears. The contact with the well-defined x-y-reference edges 2.5 ensures the accurate positioning of the inventive chuck pallet 1.3 on a clamping chuck from the very beginning. This is also valid when an expansion to a surface contact 4.2 has taken place, since the edge or line contact 4.1 was the first contact during the clamping process and has the most effect on the final position of the chuck pallet in respect of the clamping chuck, ensuring therewith the enhance accuracy of the clamping position. This accuracy remains consequently also once higher surface pressure at the edge is exerted (see sketch to the right in FIG. 4).

Figure 5:
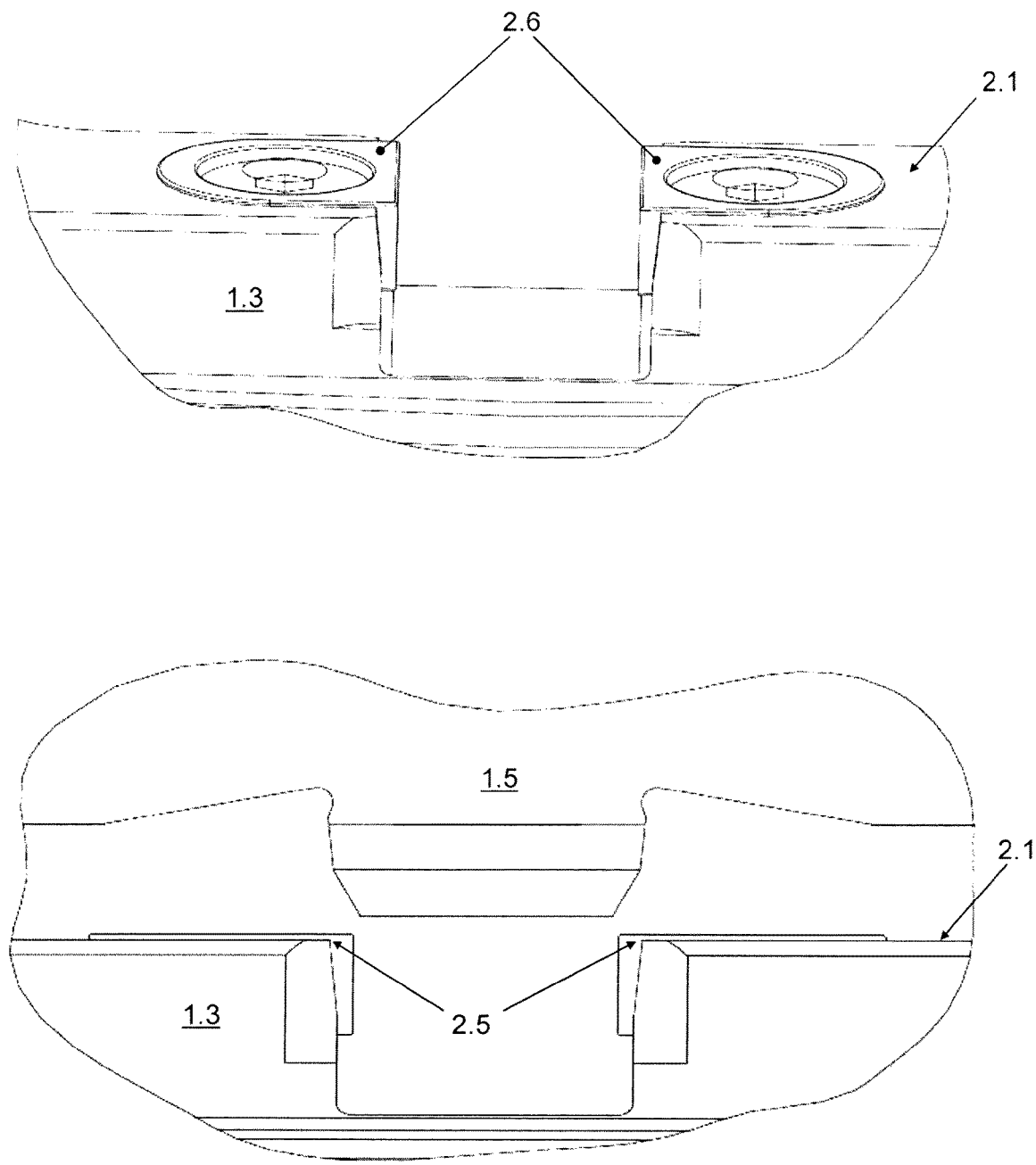
FIG. 5 shows a version having protruding protectors with a chuck lug in respective unclamped and clamped positions.

The FIG. 5 shows a version where the rubber protectors 2.6 protrude above the z-plane 2.1. By that, the chuck pallet 1.3 could be placed on a table or in a magazine without risk for damaging the x-y-reference edges 2.5.

The invention refers to chuck pallet with solid groove-sidewalls for clamping chucks. The x-y-references and z-references of the chuck pallet are hereby allocated in the same plane. The x-y-references are also allocated at the solid groove-sidewalls, whereby the solid groove-sidewalls have a tapered profile. With solid is meant that—in circumferential direction—the groove-sidewalls do not contain any slot or other structural weak spot behind the x-y-reference surfaces.

In a preferred embodiment, the plane in which the x-y-references and z-references are allocated is the z-plane.

The inventive chuck pallet has hereby solid and tapered groove-sidewalls which have an inclination ($\alpha$) to the z-axis of the pallet that is lower than the inclination ($\beta$) (to the z-axis) of the corresponding and also tapered x-y-reference surfaces of the chuck lugs in the corresponding clamping chuck.

According to the invention, in clamped configuration of the chuck pallet with the corresponding chuck, the—first occurring—line contact from the x-y-reference surfaces of the chuck pallet with the corresponding x-y-reference surfaces of the corresponding chuck lug on the chuck can expand from—the initial—line contact at the x-y-reference edges of the chuck pallet to a surface contact between the x-y-reference surface of the chuck lug and the x-y-reference surface of the chuck pallet.

In a further and preferred embodiment of the inventive chuck, the solid groove-sidewall can contain one or more slots. The solid groove-sidewall is therewith reduced—from its maximal width—to at least one solid standing bar. The one or more of these solid standing bars define thereby the x-y-reference surface(s) and the x-y-reference edge(s) of the solid groove-sidewall. Preferably a solid groove-sidewall contains just one slot defining therewith two separate and solid standing bars with x-y-reference surfaces. Most preferably, the formed solid standing bars are symmetrically arranged on both sides of a groove.

In a preferred embodiment that slot contains a protector. The protector can be elastic, for instance made of rubber or rubberlike material. The protector can be affixed to the chuck pallet by a screw or another element. In a further embodiment of that protector, the protector is protruding beyond the x-y-reference surface of the solid standing bar(s) or solid groove-sidewall towards the center of the groove. Most preferably the protector is also protruding beyond the z-plane of the inventive chuck pallet.

In a further embodiment of the inventive chuck pallet, the solid groove-sidewalls are made of non-sintered material. Even the entire chuck pallet could be made of non-sintered material.

The invention includes obviously also clamping systems comprising the aforementioned inventive chuck pallet in all its variants and a (conventional) clamping chuck. This since the inventive chuck pallet can be sold on its own to be used with known and already installed clamping chucks as obviously in combination with a clamping chuck.

REFERENCES

1.1 clamping chuck
1.2 draw sleeve
1.3 chuck pallet
1.4 z-surface protrusions of the chuck
1.5 chuck lugs, x-y-lugs
1.6 solid standing bar
2.1 z-plane, z-reference
2.2 groove
2.3 solid groove sidewalls
2.4 x-y-reference surfaces
2.5 x-y-reference edges
2.6 rubber protector
2.7 screw
3.1 tapered x-y-reference surfaces of chuck lugs 1.5
4.1 line contact of x-y-reference surfaces 3.1 of chuck lugs 1.5 with x-y-reference surface 2.4 respectively x-y-reference edges 2.5 of chuck pallet 1.3
4.2 surface contact of x-y-reference surfaces 3.1 of chuck lugs 1.5 with the x-y-reference surface 2.4 of chuck pallet 1.3
$\alpha$ inclination of the tapered solid groove-sidewall 2.3 respectively x-y-reference surface 2.4 to the z-axis
$\beta$ inclination of tapered x-y-reference surface 3.1 of the chuck lugs 1.5 to the z-axis

The invention claimed is:

1. A clamping system comprising a chuck pallet with a plurality of grooves having solid groove-sidewalls and a clamping chuck having a plurality of lugs, characterized in that the chuck pallet and clamping chuck are shiftable from an unclamped position to a clamped position, each said lug is received in a respective said groove in the clamped position, x-y-references and z-references of the chuck pallet are allocated in a same plane and the x-y-references are also allocated as respective x-y-reference surfaces at the solid groove-sidewalls, whereby the solid groove-sidewalls have a tapered profile contacting respective sidewalls of the associated lug, in the clamped position, the z-references of the chuck pallet contact respective z-references of the clamping chuck, the z-references of the clamping chuck not being portions of the lugs, the x-y-reference surfaces of the solid groove-sidewalls are tapered and in the unclamped position have an inclination ($\alpha$) to a z-axis which is lower than an inclination ($\beta$) of tapered x-y-reference surfaces of the corresponding chuck lugs to the z-axis, in a transition from the unclamped position to the clamped position an initial line contact of the x-y-reference surface of the chuck pallet with the x-y-reference surface of the corresponding chuck lug occurs and then expands from the line contact at the x-y-reference edges to a surface contact.

2. The clamping system according to claim 1, characterized in that for each of the plurality of grooves:
   each of the solid groove-sidewalls contains one or more slots; and
   the one or more slots reduce a width of the associated solid groove-sidewall to at least one solid standing bar which defines the x-y-reference surface and the x-y-reference edge of the associated solid groove-sidewall.

3. The clamping system according to claim 2, characterized in that the slot contains an elastic protector.

4. The clamping system according to claim 3, characterized in that the protector is protruding beyond the x-y-reference surface of the solid standing bar towards the center of the groove.

5. The clamping system according to claim 4, characterized in that the protector is protruding beyond a z-plane of the chuck pallet.

6. The clamping system according to claim 1, characterized in that the solid groove-sidewalls are made of non-sintered material.

7. The clamping system according to claim 6, characterized in that the entire chuck pallet is made of non-sintered material.

8. The clamping system according to claim 1, characterized in that the plane in which the x-y-references and z-references are allocated is a z-plane.

9. A clamping system comprising:
   a clamping chuck having a plurality of lugs; and
   a chuck pallet with grooves, the grooves having solid groove-sidewalls, each of the lugs respectively contacting the solid groove-sidewalls of an associated one of the grooves, characterized in that:
      x-y-references and z-references of the chuck pallet are allocated in a same plane and the x-y-references are also allocated at the solid groove-sidewalls, whereby the solid groove-sidewalls have a tapered profile; and
      at both sides of each groove, each solid groove-sidewall contains a slot reducing therewith a width of the solid groove-sidewalls to two solid vertically standing bars which define therewith an x-y-reference surface and an x-y-reference edge of the solid groove-sidewall.

10. The clamping system according to claim 9, characterized in that
    at each groove, each slot contains an elastic protector.

11. The clamping system according to claim 10, characterized in that
    the protector is made of rubber and is affixed to the chuck pallet by a screw connection.

12. The clamping system according to claim 10, characterized in that the protector is protruding beyond the x-y-reference surface of the solid standing bar towards the center of the groove.

13. The clamping system according to claim 12, characterized in that the protector is also protruding beyond a z-plane of the chuck pallet.

14. The clamping system of claim 9 wherein:
    in a transition from the unclamped position to the clamped position an initial line contact of the x-y-reference surface of the chuck pallet with the x-y-reference surface of the corresponding chuck lug occurs and then expands from the line contact at the x-y-reference edges to a surface contact;
    the clamping chuck has a plurality of z-reference surfaces forming a z-reference plane of the clamping chuck and circumferentially between the plurality of lugs; and
    in the transition, the respective z-reference surfaces of the chuck pallet and clamping chuck contact only upon reaching the clamped position.

15. A clamping system comprising a chuck pallet and a clamping chuck, wherein:
    the chuck pallet and clamping chuck are shiftable from an unclamped position to a clamped position;
    in the clamped position, z-reference surfaces of the chuck pallet contact respective z-reference surfaces of the clamping chuck;
    the chuck pallet has a plurality of grooves each having two sidewalls, each of the sidewalls having a tapered x-y-reference surface;
    the clamping chuck has a plurality of lugs, each of the lugs having two sides, each side having a tapered x-y-reference surface;
    the z-reference surfaces of the clamping chuck are surfaces of a plurality of protrusions circumferentially between the lugs;
    each said lug is received in a respective said groove in the clamped position with the x-y-reference surfaces of the sidewalls contacting the x-y-reference surfaces of the corresponding chuck lug sides; and
    in the unclamped position, the x-y-reference surfaces of the sidewalls are tapered and have an inclination ($\alpha$) to a z-axis which is lower than an inclination ($\beta$) to the z-axis of the x-y-reference surfaces of the corresponding chuck lug sides.

16. The clamping system of claim 15 wherein:
    the z-reference surfaces of the chuck pallet are in a plane; and
    the x-y-reference surfaces of the chuck pallet extend to said plane.

17. The clamping system of claim 16 wherein:
    each said groove-sidewall contains a slot reducing therewith the width of the solid groove sidewall to two solid standing bars which define the x-y-reference surface and an x-y-reference edge of the groove sidewall.

18. The clamping system of claim 17 wherein:
    at each said groove, each said slot contains an elastic protector.

19. The clamping system of claim 16 wherein:
    the x-y reference surfaces of the groove sidewalls and the x-y reference surfaces of the lug sides are positioned so that in a transition from the unclamped position to the clamped position an initial line contact of the x-y-reference surfaces of the groove sidewalls with the respective x-y-reference surface of the corresponding lug sides occurs and then expands from the line contact to a surface contact;
    the clamping chuck z-reference surfaces form a z-reference plane of the clamping chuck and circumferentially between the plurality of lugs; and
    in the transition, the respective z-reference surfaces of the chuck pallet and clamping chuck contact only upon reaching the clamped position.

20. A chuck pallet with solid groove-sidewalls for clamping chucks characterized in that:
    x-y-references and z-references of the chuck pallet are allocated in a same plane and the x-y-references are also allocated at the solid groove-sidewalls, whereby the solid groove-sidewalls have a tapered profile;
    at both sides of each groove, each solid groove-sidewall contains a slot reducing therewith a width of the solid groove-sidewalls to two solid vertically standing bars which define therewith an x-y-reference surface and an x-y-reference edge of the solid groove-sidewall; and at each groove, each slot contains an elastic protector, the protector made of rubber and affixed to the chuck pallet by a screw connection.

\* \* \* \* \*